United States Patent [19]

Long

[11] Patent Number: 4,711,076
[45] Date of Patent: Dec. 8, 1987

[54] CUTTING BLADE AND METHOD OF USE

[76] Inventor: Frederick N. Long, 2915 Hillview St., Sarasota, Fla. 33579

[21] Appl. No.: 836,250

[22] Filed: Mar. 5, 1986

[51] Int. Cl.$^4$ .............................................. A01D 34/73
[52] U.S. Cl. ...................................... 56/295; 56/12.7; 56/17.5
[58] Field of Search ................ 56/12.7, 17.5, 295, 56/DIG. 19; 30/276, 347; 428/399, 397, 400

[56] References Cited

U.S. PATENT DOCUMENTS

| | | | |
|---|---|---|---|
| 3,104,510 | 9/1963 | Voigt | 56/295 |
| 3,176,455 | 4/1965 | Buchanan | 56/295 |
| 4,063,913 | 1/1978 | Fisher | 56/295 |
| 4,186,239 | 1/1980 | Mize et al. | 56/12.7 |
| 4,243,454 | 1/1981 | Rhodes | 56/162 |
| 4,249,311 | 2/1981 | Iwaga | 56/12.7 |
| 4,261,162 | 4/1981 | Juncker | 56/295 |
| 4,265,018 | 5/1981 | Schrock . | |
| 4,282,653 | 8/1981 | Comer et al. | 56/12.7 |
| 4,302,878 | 12/1981 | Bonforte . | |
| 4,310,999 | 1/1982 | Onoue | 56/295 |
| 4,329,834 | 5/1982 | Hetrick | 56/295 |

Primary Examiner—Robert Peshock
Assistant Examiner—John Weiss
Attorney, Agent, or Firm—Stetina and Brunda

[57] ABSTRACT

An improved cutting blade structure and method of use is disclosed, characterized by use of a flexible, planar member formed of a plurality of interconnected elongate tubular segments which when rotated, contacts and effectively cuts vegetation. Due to its planar tubular segment construction, the cutting blade constantly exposes a multiplicity of new cutting edge surfaces during use and possesses an extremely low mass which reduces the possibility of personal injury to a user or property damage to structures located in the vicinity of use.

19 Claims, 6 Drawing Figures

U.S. Patent    Dec. 8, 1987    Sheet 1 of 1    4,711,076
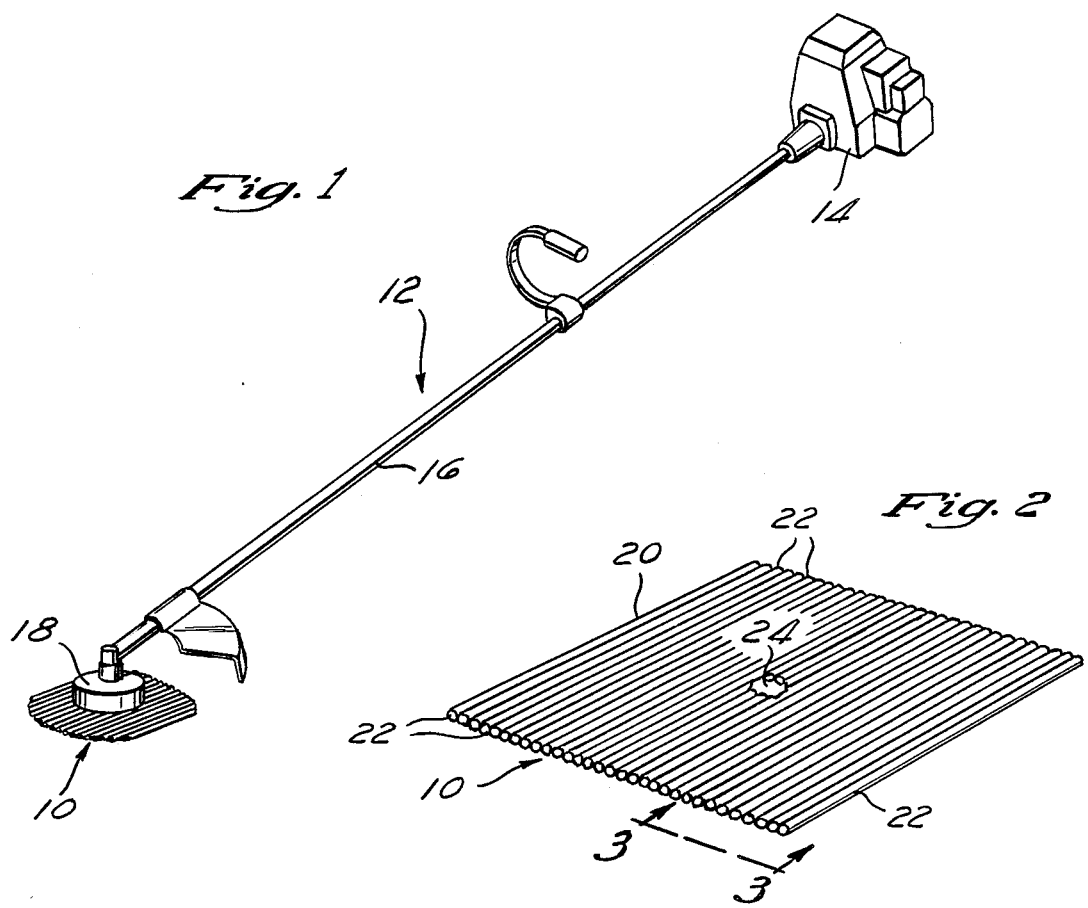

CUTTING BLADE AND METHOD OF USE

BACKGROUND OF THE INVENTION

The present invention related generally to cutting blade structures for rotary lawn mowers, trimmers, edgers and the like and, more particularly, to an improved cutting blade structure and method of cutting vegetation characterized by use of a flexible planar member formed of a plurality of interconnected elongate tubular segments which when rotated, contact and effectively cut vegetation.

As is well known, a variety of cutting blade structures have heretofore been utilized in the prior art for cutting vegetation with such devices comprising conventional metal blade reel and rotary lawn mowers, edgers, string trimmers, de-thatchers, and the like. Although all of these prior art structures have been generally suitable for their intended purpose, they all have possessed inherent deficiencies which have detracted from their overall effectiveness in the commercial and/or residential marketplace.

Foremost of the deficiencies in the prior art has been the propensity of such prior art devices to cause injury to a user of the cutting equipment or damage to structures and/or property in close proximity to the cutting site. Such injury and damage has been typically caused by the rigid metal cutting blade or portion thereof utilized on the equipment sheering or breaking off during use and being propelled airborne at high velocity to contact the user and/or nearby property or structures. Additionally, such rigid prior art devices oftentimes propel rocks, branches, or other debris contained within the vegetation being cut to similarly cause personal injury or property damage during use. Further, guards and/or mounting brackets on the prior art device oftentimes work loose from the equipment and upon contacting the prior art cutting tool are similarly propelled air borne posing a severe safety threat to the user.

Although many of these safety deficiencies have been recognized in the prior art, the proposed solutions to date have typically comprised the use of string trimmers or semi-rigid cutting blade structures on the vegetation cutting equipment which have proven limited in application due to their extremely short effective life span or their failure to be universally retrofit on the vast variety of vegetation cutting apparatus currently being utilized in the art. Further, with respect to the prior art semi-rigid cutting blade structures, such devices although reducing the safety hazards of rigid metal cutting blades, have typically possessed high mass and thereby still pose a significant possibility of personal injury or property damage during use. Examples of such prior art devices are disclosed in U.S. Pat. No. 3,104,510 issued to Voight; U.S. Pat. No. 4,302,878, issued to Bonforte; U.S. Pat. No. 4,329,832 issued to Hetrich; U.S. Pat. No. 4,265,018 issued to Schrock et al.; U.S. Pat. No. 4,065,913 issued to Fisher et al.; and U.S. Pat. No. 3,176,455 issued to Buchanan.

In addition to the safety deficiencies associated with the prior art cutting blade devices, the improved safety cutting blade devices have typically been very costly and/or have possessed deficient wear resistance properties which have detracted from their overall acceptance and use in the marketplace.

Thus, there exists a substantial need in the art for an improved cutting blade which possesses a low mass and flexible construction to reduce personal injury or property damage, is relatively low cost, has sufficient wear life for extended effective use and, can be formed in various configurations, elongate, square, triangular, etc. to allow retrofitting of the cutting blade to the various cutting tool structures and cutting applications currently being utilized in the prior art for instance edging, trimming, mowing and the like.

SUMMARY OF THE PRESENT INVENTION

The present invention specifically addresses and alleviates the above-referenced deficiencies in the prior art by providing an improved cutting blade structure and method of use wherein the cutting blade comprises a flexible planar member formed of a plurality of interconnected elongate tubular segments which when rotated upon a conventional cutting device, contacts and effectively cuts vegetation. In the preferred embodiment, the planar tubular segment construction of the cutting blade of the present invention possesses an extremely low mass such that as portions of the same are torn or broken off during the cutting process, the velocity of the same is rapidly dissipated in air and the effective impact force of the same upon a user or property is extremely minimal. Further, due to the flexible structure of the cutting blade of the present invention, the cutting blade does not possess the propensity of dislodging and propelling rocks, branches or other debris contained within the vegetation but rather, merely deflects over the same during use. As such, the personal injury and property damage deficiencies heretofore associated with prior art cutting blade designs is substantially reduced, if not eliminated.

Due to the planar tubular segment construction of the cutting blade of the present invention, the present invention constantly exposes a multiplicity of new cutting edge surfaces on each of the tubular segments during use and thereby has been found to possess extremely good wear resistance properties and a prolonged life duration.

Additionally, due to the planar construction of the cutting blade of the present invention, the present invention can be formed in a variety of planar configurations and sizes and thereby may be retrofitted onto nearly all conventional rotary cutting apparatus currently being utilized in the art.

Further, the present invention can be easily fabricated from plastic materials at extremely low cost and thereby proves economically feasible in the marketplace. In addition, due to the flexibility of the cutting tool of present invention, the cutting tool does not mar or discolor pavement, stepping stones or other environmental structures (i.e. hardscape) during use.

DESCRIPTION OF THE DRAWINGS

These all well as other features of the present invention will become more apparent upon reference to the drawings wherein:

FIG. 1 is a perspective view of a conventional vegetation edge trimmer device having the improved cutting blade of the present invention disposed thereon;

FIG. 2 is a perspective view depicting the improved cutting blade structure of the present invention;

FIG. 3 is an enlarged cross-sectional view taken about lines 3-3 of FIG. 2 showing an embodiment of the tubular construction of the cutting blade of the present invention;

FIG. 4 is an analogous cross-sectional view to that depicted in FIG. 3 illustrating an additional embodiment for the tubular construction of the cutting blade of the present invention;

FIG. 5 is an enlarged perspective fragmentary view illustrating the typical wear associated with the cutting blade of the present invention and depicting the manner in which new cutting blade surfaces are continuously exposed during use of the same; and FIG. 6 is a perspective view of the cutting blade of the present invention depicting the manner in which the cutting blade deflects upon contacting a rock or other debris during the cutting process.

DETAILED DESCRIPTION OF THE PREFERRED EMBODIMENT

Referring to FIG. 1, there is shown the improved cutting blade device 10 of the present invention which for purposes of explanation and not limitation, is disposed upon a conventional edge trimmer device, designated generally by the numeral 12, utilized for cutting lawn vegetation and the like. As is well known, such edge trimmer devices 12 typically include an engine or motor 14 disposed adjacent one end thereof, which transmits power to a rotating drive shaft or the like disposed within the interior of an elongate shaft 16, via suitable gear reduction or other power transmission means. A spindle assembly 18 is provided adjacent the opposite end of the device 12 which rotates in response to the motive force supplied by the engine or motor 14.

As is conventional, the spindle assembly 18 may accomodate differing attachments for specific vegetation cutting purposes, such as a weeder cultivator attachment, string trimmer attachment, brush cutting attachment, and/or tree pruning attachment (not shown) which facilitates multiple uses for the device 12. An example of such a prior art conventional edge trimmer device is the model number 2500LP yard care tool manufactured by HMC, Inc. of Long Beach, Calif. and marketed under the registered trademark "THE GREEN MACHINE ®".

As will be recognized, the cutting blade 10 of the present invention is mounted to the spindle assembly 18 of the edge trimmer device 12 by way of an arbor which extends through an aperture formed in the central portion of the cutting blade 10 and attaches to the spindle 18 of the edge trimmer device 12. Although the use of the cutting blade 10 of the present invention is being disclosed specifically in relation to use upon a conventional edge trimmer device 12, those skilled in the art will recognize that the cutting blade 10 of the present invention can be effectively utilized on nearly all rotary vegetation cutting devices currently in use, such as rotary lawn mowers, string trimmers, edgers, and dethatching machines and, for purposes of this application, the term "edge trimmer device" and/or "vegetation cutting equipment" shall be defined to include all such analogous rotary vegetation cutting equipment and structures.

Referring more particularly to FIG. 2, the improved cutting blade 10 of the present invention comprises a planar member 20 preferrably formed of a plurality of elongate hollow or tubular segments 22 formed of a plastic material possessing moderate flexibility and superior abrasion resistant characteristics. Although a variety of materials can be utilized for the planar member 20, a superior candidate is a polyolefin material, although other plastic polymer materials are contemplated herein. The plural tubular segments are disposed in an interconnected side by side orientation and may be formed by convention extrusion or comparable fabrication methods. In this regard, the particular method of fabrication disclosed in U.S. Pat. No. 4,243,454 issued to Rhodes has been found to be a suitable method of producing the same, the disclosure of which is expressly incorporated herein by reference.

The plural tubular segments may be formed having various cross-sectional configurations. For purposes of illustration and not limitation, two embodiments of the tubular segments 22 are depicted. In FIG. 3 the plural tubular segments 22 are formed having a cylindrical cross-sectional configuration, while in FIG. 4 they are depicted having a square or rectangular cross-sectional configuration. However, other polygonal cross-sectional configurations are contemplated herein, such as triangular, hexagonal, pentagonal, etc. Further, corrogated cross-sectional configurational constructions are contemplated herein such as those utilized in the corrogated paper stock industry and for purposes of this application the terms "tubular segments" shall be defined to additionally include such corrogated configurations.

In each sentence, each of the plural hollow tubular segments 22 are abutted and interconnected in a side by side orientation so as to form a substantially planar configuration. The planar member 20 is preferably fabricated as an elongate sheet which may then be cut or formed in desired sizes and configurations to permit use of the same on differing rotary vegetation equipment. In addition, the thickness of the planar member 20 may be varied between approximately one sixteenth of an inch to one-half of an inch, although preferably the same is maintained at approximately one quarter of an inch. As previously mentioned, the planar member 20 may be fabricated in differing configurations, although in the preferred embodiment a square configuration as depicted in FIG. 2 has been found preferable for use on edge trimmer devices 12. Additionally, to permit ease in installation or mounting of the planar member 20 to the edge trimmer 12, a central aperture 24 is preferably formed therein which, as previously mentioned, permits an arbor to be extended therethrough and be attached to the spindle assembly 18 of the edge trimmer 12. Alternatively, other conventional assembly means such as opposing plate flanges, collets, etc. may be utilized for mounting the cutting blade to the edge trimmer.

With the structure defined, the operation and method of utilizing the improved cutting blade 10 of the present invention may be described. As will be recognized, during rotational movement of the spindle assembly 18 of the edge trimmer 12, a corresponding rotational movement is provided to the cutting blade 10. The peripheral edges 26 of the cutting blade 10 may then be contacted against the vegetation to be cut in a conventional manner. As depicted in FIG. 5, during use of the cutting blade 10, the peripheral edges 26 are slowly and gradually abrated or torn by the vegetation. However, as the peripheral edges 26 are broken down during use, they constantly create or expose new cutting surfaces or edge portions 28. As such, the cutting blade 10 of the present invention in effect, possesses a self-sharpening capability which has been found to result in effective vegetation cutting and prolonged life.

In addition, due to the plural tubular segments 22 having an extremely low mass, when portions of the same are abrated or broken off of the cutting blade 10 during operation and propelled through the air, the velocity of the same is rapidly dissipated in air and the effective impact force of the same upon a user or property is extremely minimal.

In addition, due to the flexibility of the cutting blade 10 of the present invention, upon the cutting blade 10 contacting rocks or other debris 30 in the vegetation being cut, the cutting tool 10 readily deflects about the rock 30 without breakage as depicted in FIG. 6 thereby ensuring that the rock or debris 30 will not be propelled airborne and, further, reducing the possiblity of large portions of the cutting blade 10 from being broken off the cutting blade. As such, the present invention specifically reduces the safety hazards heretofore associated in the art.

As will be recognized, during prolonged use upon rotary equipment, the cutting blade 10 of the present invention will eventually wear and assume a generally circular configuration. The applicant has found, however, that superior vegetation cutting occurs when a non-circular peripheral configuration of the cutting blade 10 is provided. As such, it is contemplated herein that upon extended wear of the cutting blade 10, the periphery of the cutting blade 10 may be manually trimmed as by way of use of shears or a knife to provide a non-circular peripheral configuration.

Although for purposes of this application certain materials, configurations and sizes have been specified, those having ordinary skill in the art will recognize that various modifications of the same may be made without departing from the spirit of the present invention and such modifications are clearly contemplated herein.

What is claimed is:

1. An improved cutting blade device for use on rotary vegetation cutting equipment comprising;
    a substantially planar member formed of a multiplicity of elongate tubular segments interconnected in a side by side orientation; and
    means formed on said planar member for mounting said planar member to rotary vegetation cutting equipment for rotational movement therewith.

2. The device of claim 2 wherein said planar member is formed of a plastic material.

3. The device of claim 2 wherein said plastic material possesses moderate flexibility sufficient to allow said planar member to deflect without breakage upon contact with debris disposed within vegetation being cut.

4. The device of claim 3 wherein said planar member is formed of a plastic material having a sufficiently low mass that upon abrasion of portions of said planar member during use, the velocity of said portion is rapidly dissipated in the air.

5. The device of claim 4 wherein said plastic material comprises polyolefin.

6. The device of claim 4 wherein said plurality of tubular segments are formed having an annular cross-sectional configuration.

7. The device of claim 4 wherein said plurality of tubular segments are formed having a polygonal cross-sectional configuration.

8. The device of claim 1 wherein said mounting means comprises a central aperture formed through said planar member.

9. An improved cutting blade device for use on rotary vegetation cutting equipment comprising:
    a substantially planar member formed of a multiplicity of elongate tubular segments interconnected in a side by side orientation, with the periheral edges of said planar member defining a plurality of cutting surfaces adapted to contact and cut vegetation.

10. The device of claim 9 wherein said planar member is formed of a flexible abradant resistant material.

11. The device of claim 10 wherein said planar member is formed of a plastic material.

12. The device of claim 11 wherein said plurality of elongate tubular segments are formed having a polygonal cross-sectional configuration.

13. The device of claim 11 wherein said plurality of elongate tubular segments are formed having an annular cross-sectional configuration.

14. A method of cutting vegetation by use of a rotary vegetation cutting device comprising the steps of:
    mounting a substantially planar member formed of a multiplicity of elongate tubular segments connected in a side by side orientation to said rotary vegetation cutting device.
    imparting rotational movement to said planar member; and
    contacting the peripheral edges of said planar member against vegetation desired to be cut.

15. The member of claim 15 comprising the further step of forming said planar member to possess a polygonal peripheral edge configuration.

16. The method of claim 15 comprising the further step of re-forming said planar member after degredation caused by wear to possess a polygonal peripheral edge configuration.

17. The method of claim 16 wherein said planar member is formed of a plastic material and said re-forming step comprises cutting the periphery of said planar member to possess a polygonal configuration.

18. A cutting blade for use on rotary vegetation cutting equipment comprising:
    a substantially planar member having and defining between a thin top wall and a thin bottom wall a multiplicity of cavities having thin side walls, also having and defining a substantially central hole through which a fastener may be attached to a spindle of a rotary vegetation cutting equipment in order to be circularly rotate the planar member about an axis generally perpendicular to the plane of said planar member; in the plane of the planar member;
    wherein any ones of the thin-top-wall thin-bottom-wall thin-sidewall multiplicity of cavities which are at the periphery of the planar member are subject to rupture and the walls to wear, the walls accruing damage during contact with vegetation and with debris during circular rotation on rotary vegetation cutting equipment;
    wherein the ruptured cavities and damaged walls at the periphery of the planar member generally present irregular wall edges which are thin, and by virtue of that thinness are effective cutting surfaces to vegetation.

19. The cutting blade according to claim 18 wherein the multiplicity of cavities defined by the substantially planar member comprises:
    a multiplicity of elongate tubular segments, having thin top and bottom and side walls, which are joined in side by side orientation.

* * * * *